June 21, 1938.  C. A. DESIMONE ET AL  2,121,734
LIQUID DISPENSING APPARATUS
Filed Sept. 30, 1937   5 Sheets-Sheet 1
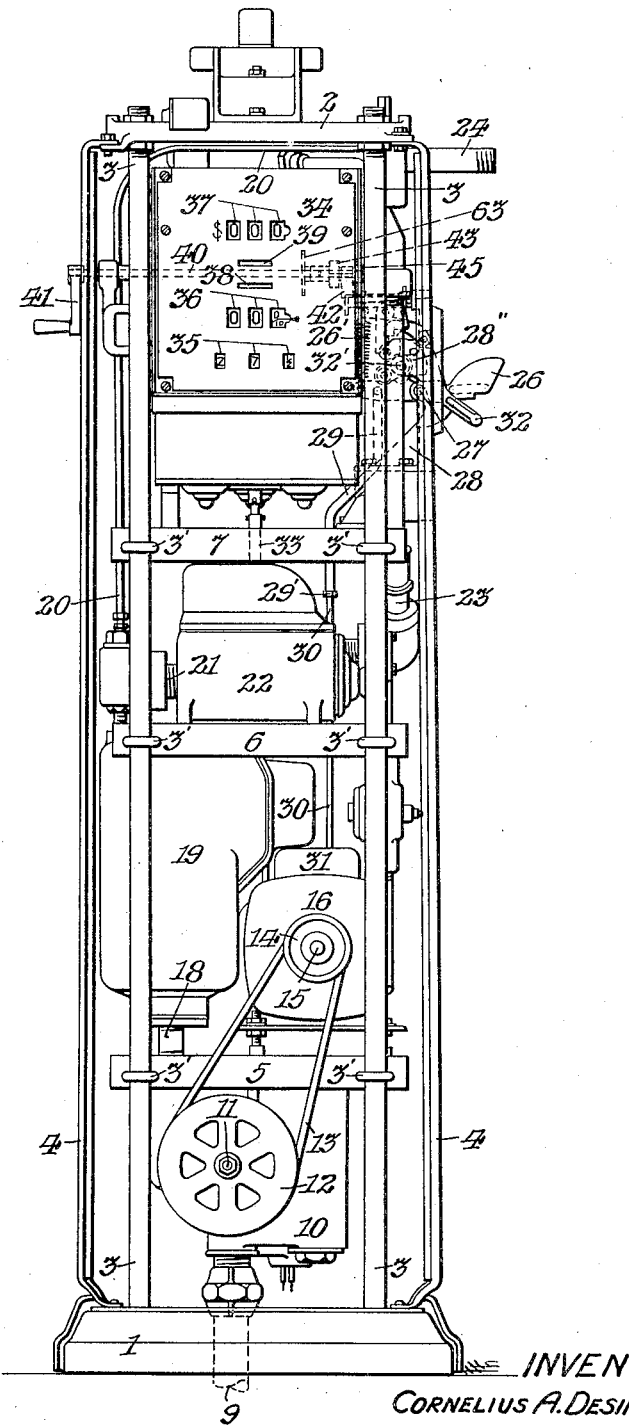
FIG. I.
INVENTORS:
CORNELIUS A. DESIMONE
JOSEPH C. WOODFORD,
BY Arthur E. Paige, Atty.

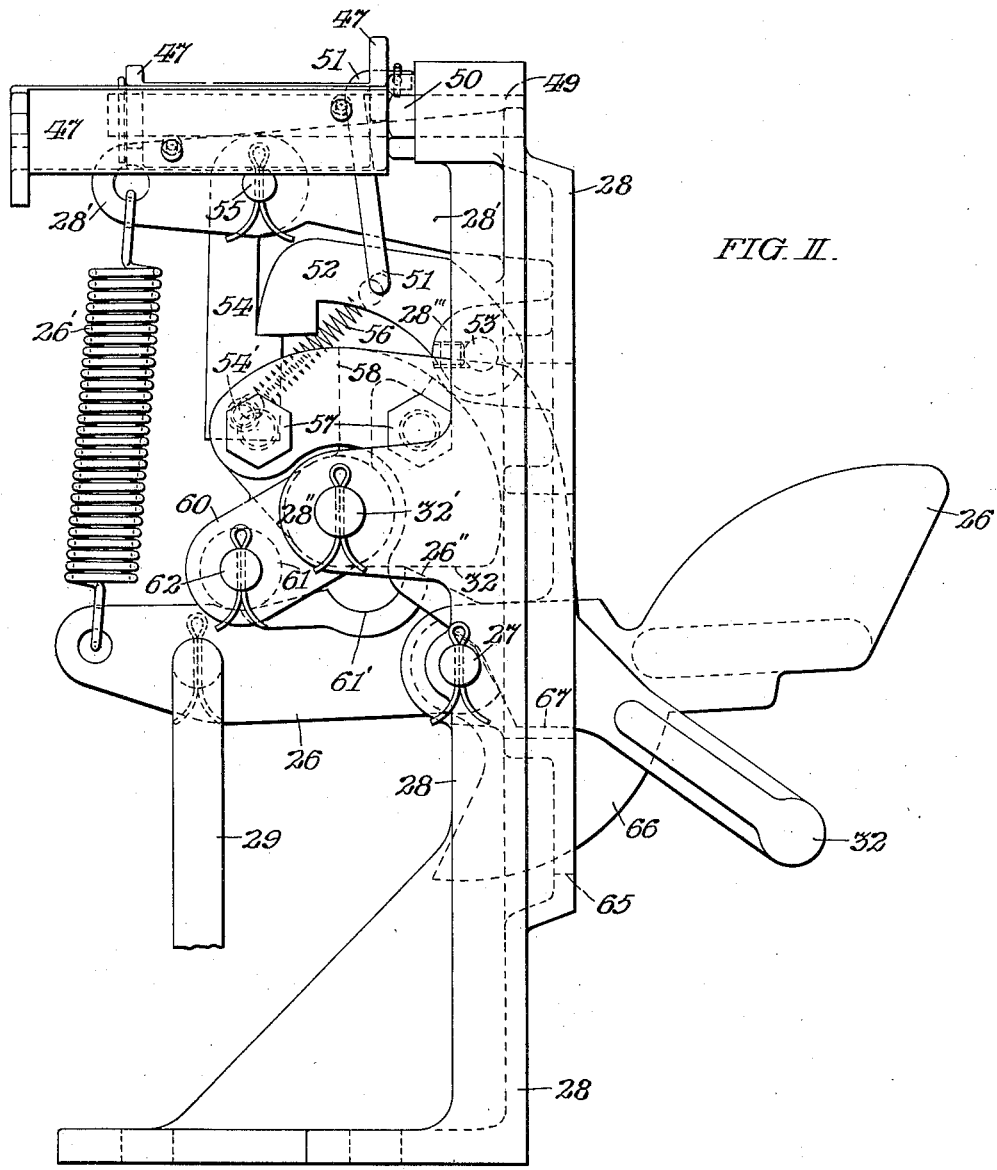

June 21, 1938.  C. A. DESIMONE ET AL  2,121,734
LIQUID DISPENSING APPARATUS
Filed Sept. 30, 1937   5 Sheets-Sheet 3
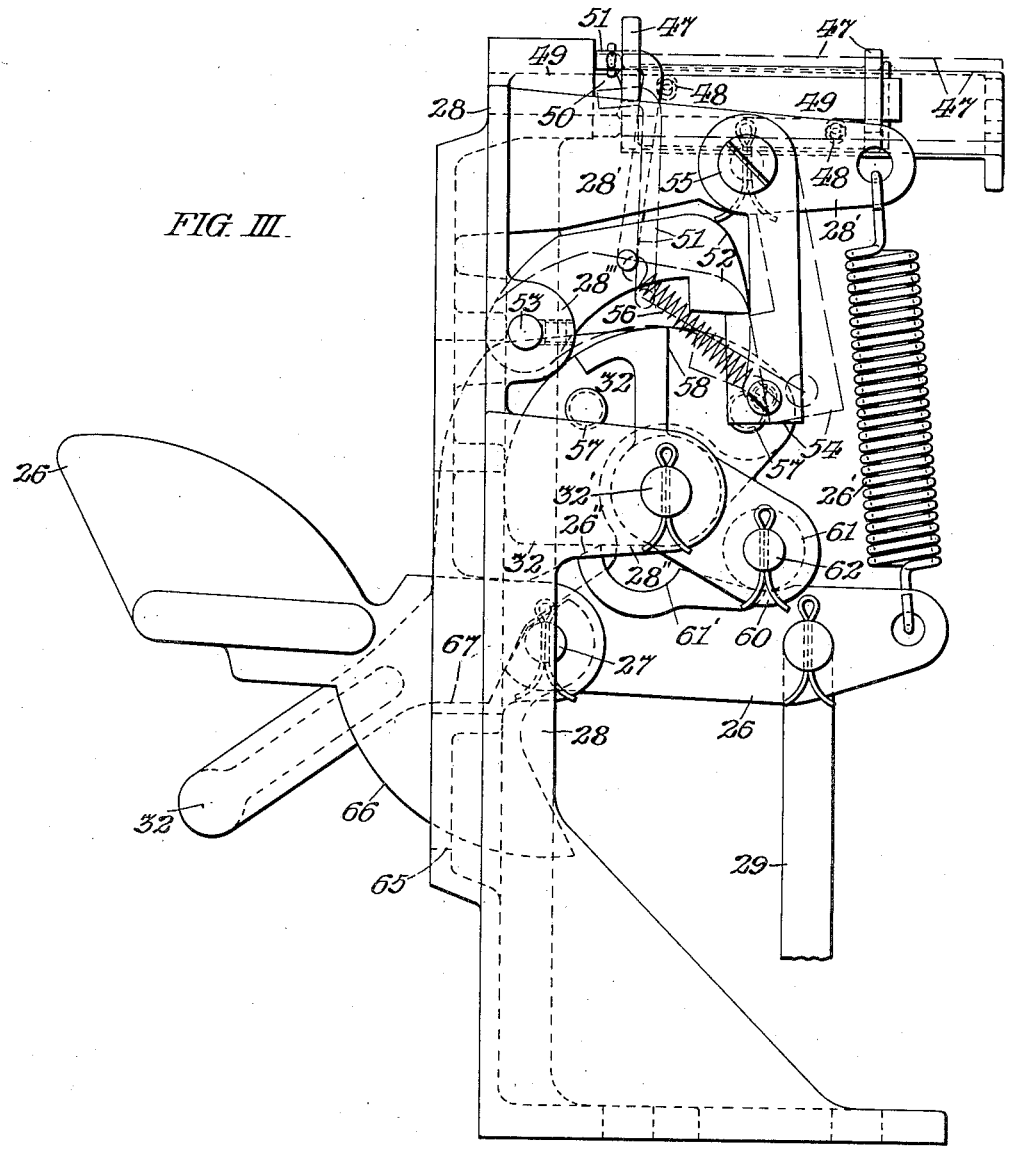
FIG. III.
INVENTORS:
CORNELIUS A. DESIMONE
JOSEPH C. WOODFORD,
BY Arthur E. Paige Atty.

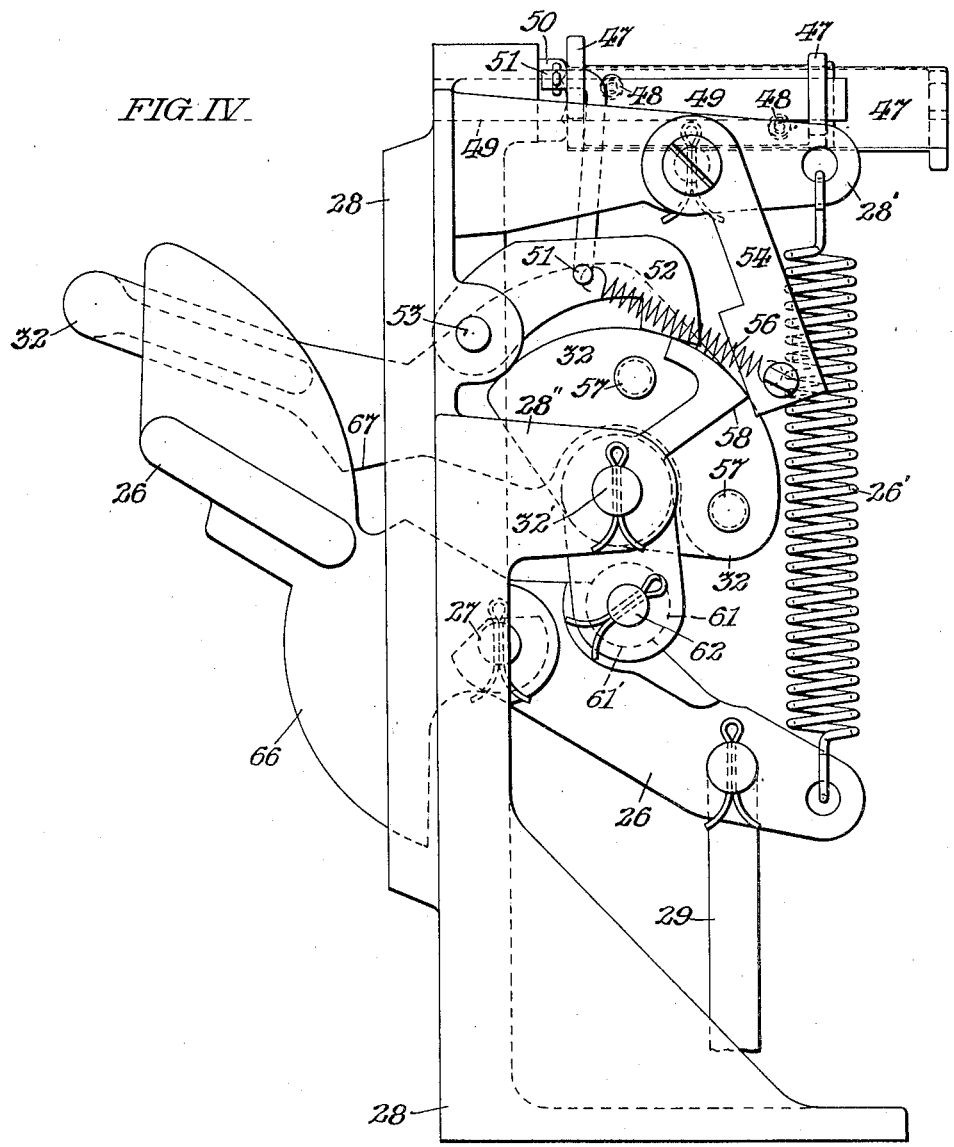

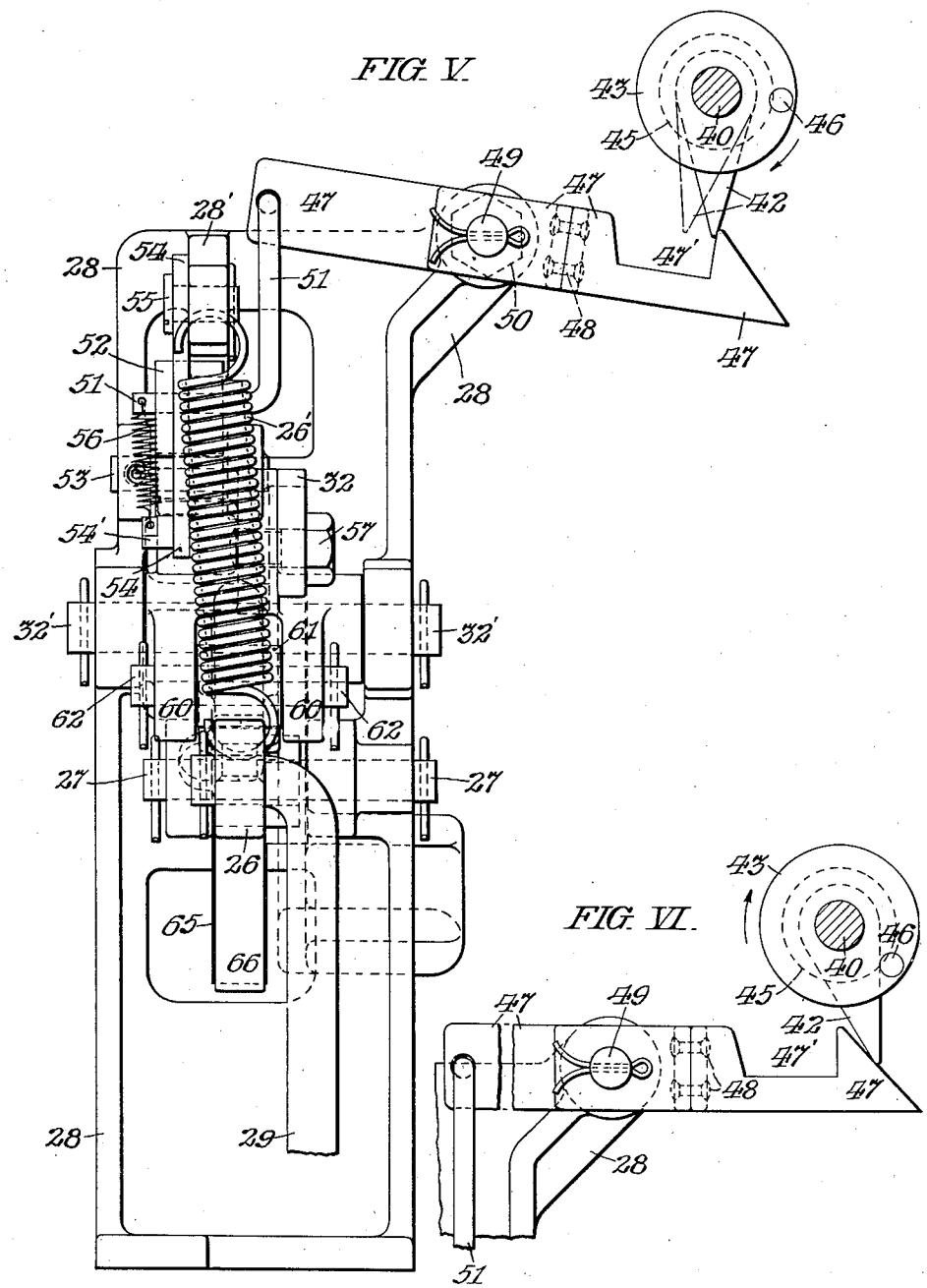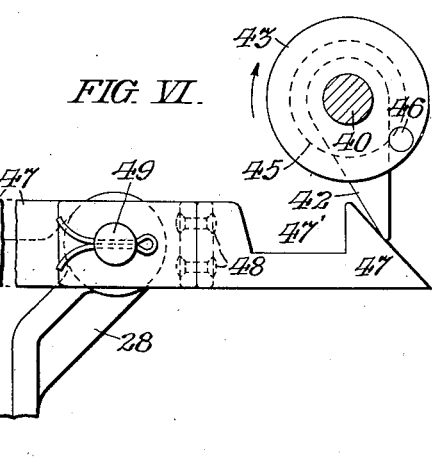

Patented June 21, 1938

2,121,734

UNITED STATES PATENT OFFICE 2,121,734

LIQUID DISPENSING APPARATUS

Cornelius A. Desimone, Bala Cynwyd, and Joseph C. Woodford, Haverford, Pa., assignors to John Wood Manufacturing Company, Inc., Conshohocken, Pa., a corporation of Delaware Application September 30, 1937, Serial No. 166,624

6 Claims. (Cl. 221—95)

Our invention is particularly applicable to metering pumps for dispensing gasolene, including a hose through which the liquid is dispensed by means of a pump driven by an electric motor; a meter being included between the pump and hose and connected with means for indicating the volume of liquid dispensed through the meter; such indicating means comprising a circular series of numerals including zero. Such apparatus is ordinarily provided with an electric switch which may be manipulated by the dispensing operator to start and stop said motor, and also manually operative means for resetting the indicator to zero position. Moreover, it is usual to provide a switch operating lever which serves as a support for the hose between successive dispensing operations and which is operated by the weight of the hose to open the switch and stop the motor. However, unless means are provided to insure the return of the indicator to zero position between successive dispensing operations of such apparatus; an operator may accidentally or intentionally fail to reset the indicator to zero position and thus cheat the next customer to the extent that the indicator is left advanced with respect to its zero position.

Various means have been proposed to compel or induce the operator to zeroize the indicator of such apparatus between successive dispensing operations; varying from a mere sign on the apparatus warning the customer to be sure that the indicator is thus zeroized, to complicated locking means for mechanically locking the apparatus at the termination of one dispensing operation until it is unlocked by zeroizing the indicator to permit the next succeeding dispensing operation.

In the form of our invention chosen for illustration herein, such a hose supporting switch lever may be manually moved to close the switch at any time whether the indicator is zeroized or not, but is automatically moved to open the switch and stop the motor unless the switch lever is held by hand or by what we term a lock lever. The construction and arrangement are such that the lock lever cannot be used to hold the switch closed, unless and until the indicator is zeroized by complete operation of the means for manually resetting the indicator to zero position.

Our invention includes the various novel features of construction and arrangement hereinafter more definitely specified.

In said drawings;

Fig. I is a front elevation of a metering pump of what is known as the curbstand type for dispensing gasolene and including a convenient embodiment of our invention.

Fig. II is an elevation on a larger scale of the mechanism including the hook lever and lock lever as shown projecting at the right hand side of Fig. I.

Fig. III is an elevation of the opposite side of the mechanism as shown in Fig. II.

Fig. IV is an elevation similar to Fig. III but with the parts of the mechanism in a different position.

Fig. V is an elevation of parts of the mechanism as seen from the left hand side of Fig. II and right hand side of Fig. III, showing the indicator resetting shaft carrying the cam dog in co-operative relation with the cam lever of the mechanism shown in Figs. II and III.

Fig. VI is a fragmentary elevation of parts of the mechanism shown in Fig. V; but in a different position.

Referring to Fig. I; the liquid dispensing apparatus is mounted in the housing which is adapted to be fixed upon a pavement or platform at a curb or driveway and includes the cast metal base member 1 and top member 2 which are substantially rectangular and connected at their corners by four cylindrical standards 3, and four channel bars 4 which will serve to support a thin sheet metal casing which is omitted from the drawings but which includes four substantially flat panels extending vertically upon the four sides of the housing. Said frame standards 3 are also cross-connected by transverse frame members 5, 6, and 7, rigidly connected therewith by U-bolts 3'.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the shaft 15 of the electric motor 16, which is supported by said transverse frame member 5. The liquid is discharged from said pump 10 through the conduit 18 into the receptacle 19 in which air and vapor entrained in the liquid are eliminated from the liquid and discharged through the outlet conduit 20 which extends to the top of the frame, from which the eliminated fluid is discharged. The liquid passes from said casing 19 through the conduit 21 to the meter 22 from which it is discharged through the conduits 23 and 24. The conduit 24 is connected with a flexible dispensing hose having the usual valve controlled nozzle at its discharge end.

The hook lever 26, which, as shown in Figs. II,

III and IV, is fulcrumed at 27 on the bracket 28, rigidly connected with said transverse frame member 7, is provided to support the hose nozzle in idle position, on its outer end, and for manually operating the electric motor switch which is closed by upward movement of the outer end of said hook lever.

The inner end of said hook lever 26 is pivotally connected with the vertically reciprocatory link 29 which is adjustably connected, by the coupling 29' shown in Fig. I, with the switch rod 30 for operating said switch in the box 31.

Said lever 26 and switch rod 30 are continually stressed toward the open position of said switch by the spring 26' extending from the inner end of said lever 26 to the arm 28' on said bracket 28. Movement of said lever 26 by said spring is limited by its shoulder 26'' contacting with the under side of the lock lever 32 as shown in Figs. II and III. Said lock lever 32 is fulcrumed on the shaft 32' which is stationary in the arms 28'' of said bracket 28.

As shown in Fig. I; the shaft 33 which is turned by the mechanism of the meter 22 drives computing registering mechanism including series of decimally numbered wheels comprising indicating mechanism covered by the face plate 34. Said face plate 34 has windows 35 for displaying numerals representing the price of gasolene. The numerals displayed at said window 35 indicate the price of gasolene to be twenty-seven and one-half cents per gallon. Said indicator has windows 36 for displaying numerals representing the quantity of gasolene dispensed but, as the indicator is in zero position that fact is indicated by the ciphers displayed. Said indicator has windows 37 for displaying numerals representing the value of the liquid dispensed at a single dispensing operation but, as the indicator is in zero position that fact is manifested by the ciphers shown in said windows. Said indicator has the single window 38 for display of numerals of a total adder representing the total quantity of liquid which has been dispensed and has the single window 39 for display of numerals of a total adder of the value of all of the liquid which has been dispensed. In the form of our invention shown the indicator is provided with manually movable shutters which are normally closed so that the totals indicated by the adders behind the windows 38 and 39 are not visible.

The shaft 40 projecting at the left hand side of Fig. I may be engaged by the removable crank 41, in the custody of the operator, for resetting the indicating mechanism to the zero position shown, by rotation of said shaft 40 clockwise as seen from the left hand side of Fig. I; and as seen in Figs. V and VI.

Referring to Figs. I, V, and VI; loosely hung upon the resetting shaft 40 near its right hand end, is the cam dog 42 between the collars 43 and 45 which are fixed on said shaft. Said collar 43 has the pin 46 rigidly connected therewith, projecting toward the collar 45 and in the path of said dog 42. Normally that is to say, when the indicator is not being reset and the apparatus is in condition for dispensing liquid, said dog hangs vertically, as shown in Fig. V, and the shaft 40 is in the rotary position shown in said figure and the pin 46 is out of engagement with said dog 42. In that position, the point of the dog hangs in the notch 47' of the cam lever 47, as shown in Fig. V. Said lever 47 is conveniently formed of two pieces rigidly connected by rivets 48. The piece having the notch 47' is L-shaped and the other piece U-shaped. The bifurcations of the latter, one of which is longer than the other, are both hung on the fulcrum shaft 49 which is a stud screwed into said bracket 28 at one end and secured by the jam nut 50. The longer bifurcation of said cam lever 47 has pivotally connected therewith the upper end of the pendent link 51, as shown in Figs. II and V. Said link 51 is pivotally connected at its lower end with the latch 52 which is pivoted on the pin 53 fixed in the frame 28 and extending between the two lugs 28''' which are part of said frame 28. In the normal position shown in Figs. I, II, and III, said latch 52 is engaged and upheld by the latch 54 which is hung on the stud 55 fixed in said arm 28' of the bracket 28. The spring 56 which extends from the lower end of said link 51 to the stud 54' on said latch 54 continually stresses said latch 54 toward its position of engagement with said latch 52.

Said lock lever 32 is conveniently formed of two pieces which are rigidly connected by the cap screws 57; the piece which includes the hub encircling the fulcrum shaft 32', having, in unitary relation therewith, the abutment 58 for engagement by said latch 52 when the latter is released from the latch 54. When said lock lever 32 is thus engaged by the latch 52; the lock lever is inoperative. However, in the position shown in Figs. II and III, the mechanism is in position to be manipulated by the operator, to move it to the position shown in Fig. IV, the latter being the position in which the motor switch is closed by the downward thrust of the link 29, to initiate a dispensing operation. The piece of said lock lever 32 having the abutment 58 thereon also has two arms 60 carrying between them the lock roller 61 which is journaled on the shaft 62. In the normal idle position shown in Figs. II and III said roller 61 serves as a stop limiting the action of the spring 26' which then holds the outer end of said hose supporting lever 26 in its lowermost position in which the motor switch is open.

To move the parts from the normally idle position shown in Figs. II and III to the dispensing position shown in Fig. IV; the operator first pushes up the outer end of said lever 26 to the position shown in Fig. IV; thus pushing down the switch operating link 29 to the position shown in Fig. IV, in which the switch is closed. If the operator then released said lever 26 from the position shown in Fig. IV it would be immediately restored to the idle position shown in Fig. II by the stress of the spring 26'. However, the outer end of said lock lever 32 is so related to the outer end of the hose supporting lever 26 that if the operator desires to have the lever 26 mechanically held in its dispensing position after he releases it; he may also push up the outer end of the lock lever 32, from the position shown in Figs. II and III to the position shown in Fig. IV, with the effect that said abutment 58 on the lock lever 32 strikes the lower portion of said latch 54 and thrusts it, clockwise in Fig. II, out of engagement with the latch 52, and the successive turning movement of said lock lever 32 engages the roller 61 in the locking recess 61' in said lever 26, as shown in Fig. IV; in which position the switch is held closed against the stress of the spring 26' by said lock lever 32 and its roller 61.

When the dispensing operation is concluded; the operator may stop the motor and pump by hanging the hose over the levers 26 and 32, in the position shown in Fig. IV, or otherwise manually depressing the outer ends of said levers back to the position shown in Figs. II and III. However, such manual movement of the levers 26 and 32 does not otherwise restore the mechanism to the normal idle position shown in Figs. II and III, because as shown in Fig. IV, the latch 52 is not only released from engagement with the latch 54 but stressed by said spring 56 so that when said levers 26 and 32 are pulled down at their outer ends to the position shown in Figs. II and III, the abutment 58 on the lock lever 32 is instantly engaged by said latch 52 so that said lever 32 cannot be used to hold up the lever 26 to hold said switch closed.

That downward movement of the latch 52 by the spring 56 tilts said cam lever 47 from the position shown in Fig. V to the position shown in Fig. VI, incidently idly turning the loose dog 42 to the position indicated in dash lines in Fig. V. Thereupon, if anyone attempts to close the switch by manipulation of the lever 26 the switch is instantly opened by the spring 26′ when released by the operator and until said indicator resetting shaft 40 is manually turned, clockwise, from its normal idle position shown in full lines in Fig. V, more than a complete revolution. Such movement causes the pin 46 to pick up the loose dog 42 and carry it over to the position shown in Fig. VI, in which the dog is presented against the right hand inclined end of said cam lever 47 so that continued movement of said shaft, clockwise, from the position shown in Fig. VI to the position shown in dash lines in Fig. V, causes said cam dog 42 to depress the outer end of said cam lever 47 to it normal position shown in Fig. V. In its movement from the position shown in Fig. VI to the position shown in Fig. V, said cam lever 47 lifts the link 51 and latch 52 until the free left hand end of the latch 52, shown in Fig. II, is above the shoulder of the latch 54 and the latter is snapped, by its spring 56, into engagement with said latch 52 as shown in Fig. II to thereafter uphold it and permit the locking lever 32 to be manipulated to lock the lever 26 with the switch closed as above described.

As above noted, said resetting shaft 40 is turned more than a complete revolution from its normal position shown in Fig. V to effect the resetting of the indicator mechanism behind the plate 34, to its zero position, by the gear 63, on said shaft 40, shown in Fig. I; incidently resetting the cam lever 47 from the position shown in Fig. VI to the position shown in Fig. V. However, the indicating mechanism includes a spring which returns the shaft 40, counter-clockwise with reference to Fig. V, approximately 45°, leaving the pin 46 in the position shown in Fig. V. However, the specific means for connecting said resetting shaft 40 with said indicating mechanism is not herein claimed.

As shown in Fig. I; the levers 26 and 32 project into the outer atmosphere through the sheet metal casing inclosing the metering pump mechanism and, consequently, the right hand face of the bracket 28 as shown in Fig. II is exposed to wind, rain, and snow. Therefore, it is desirable to have the slot 65 through which said levers project fit the levers as closely as possible, both in the position shown in Fig. II and in the position shown in Fig. IV. Therefore, we provide the sectoral web 66 on said lever 26 merely to fill said slot 65, and provide the web 67 on the lever 32 for the same purpose. It may be observed with reference to Figs. II and III that the web 67 fits closely in said slot 65 when in the normal idle position so that said slot 65 is then substantially closed.

Said latch 52 is in fact a detent movable to alternately detain and release the lock lever 32. The pin 46 carried by said shaft 40 is in fact a crank, and it and the dog 42 carried by said shaft 40 constitute rotary eccentric releasing means for said detent means. The cam lever 47 and the means for connecting it with said detent and operating the latter, constitute automatically operative controlling means connecting said lock lever 32 with the resetting means comprising the shaft 40 and means for manually turning it. However, other suitable detent and releasing means may be employed.

Therefore, we do not desire to limit ourselves to the precise details of construction and arrangement or method of operation herein set forth, as it is obvious that various modifications may be made therein without departing from the essential features of our invention as defined in the appended claims.

We claim:

1. The combination with an electric switch; of a spring continually tending to open said switch; manually operative means for closing said switch; automatically operative switch controlling means permitting said switch to be manually opened and closed at any time, but including a manually operative lock lever for holding said switch in closed position, detent means for preventing operation of said lock lever; and means for releasing said detent means, including a manually rotary shaft, carrying a rotary eccentric, operatively related to an element of said detent means: said eccentric including a cam dog loosely journaled on said shaft, and a crank carried by said shaft for picking up and turning said dog with said shaft; whereby said detent is released only when said shaft and eccentric have been turned to a predetermined extent.

2. The combination with an electric switch; of a spring continually tending to open said switch; manually operative means for closing said switch; automatically operative switch controlling means permitting said switch to be manually opened and closed at any time, but including a manually operative lock lever for holding said switch in closed position, detent means for preventing operation of said lock lever, including a latch for engaging said lock lever, a cam lever, and a link connecting said latch with said cam lever; and means for releasing said detent means, including a manually rotary shaft, carrying a rotary eccentric, operatively related to an element of said detent means; said eccentric including a cam dog loosely journaled on said shaft, and a crank carried by said shaft for picking up and turning said dog with said shaft; whereby said detent is released only when said shaft and eccentric have been turned to a predetermined extent.

3. The combination with an electric switch; of a spring continually tending to open said switch; manually operative means for closing said switch; automatically operative switch controlling means permitting said switch to be manually opened and closed at any time, but including a manually operative lock lever for holding said switch in closed position, detent means for preventing operation of said lock lever, including a latch for engaging said lock lever, a cam lever, and a link connecting said latch with said cam lever; a second latch for engaging the first-mentioned latch, and a spring connecting and continually stressing said two latches toward their engaged position; and means for releasing said detent means, including a manually rotary shaft, carrying a rotary eccentric, operatively related to an element of said detent means; whereby said detent is released only when said shaft and eccentric have been turned to a predetermined extent.

4 Mechanism as in claim 3; wherein the rotary eccentric includes a cam dog loosely journaled on said shaft, and a crank carried by said shaft for picking up and turning said dog with said shaft.

5. In liquid dispensing apparatus having flow establishing means under hand control, including a movable support for a dispensing hose, said support having a locking recess; a register for indicating the quantity of liquid dispensed at each dispensing operation and reset mechanism for zeroizing said register; the combination therewith of controlling mechanism for the flow establishing means comprising a spring connected with said hose support and continually tending to stop said flow; hold-on means operable to restrain the action of said spring in stopping said flow after it has been started, including a locking lever having means for engaging the locking recess in said hose support; and means making the restraining operation of said hold-on means dependent upon the operation of said reset mechanism.

6. The combination with an electric switch; of means continually tending to open said switch, including a movable support for a dispensing hose and a spring continually stressing said hose support to open said switch; said support being manually operative for closing said switch; automatically operative switch controlling means permitting said switch to be manually opened and closed at any time, but including a manually operative lock lever for holding said hose support in the position in which the switch is closed; detent means for preventing operation of said lock lever; and means for releasing said detent means, including a manually rotary shaft, carrying a rotary eccentric, operatively related to an element of said detent means; whereby said detent is released only when said shaft and eccentric have been turned to a predetermined extent.

CORNELIUS A. DESIMONE.
JOSEPH C. WOODFORD.